United States Patent
Gorni et al.

(10) Patent No.: US 6,928,221 B2
(45) Date of Patent: Aug. 9, 2005

(54) DEVICE FOR THE COMPENSATION OF CHROMATIC DISPERSION

(75) Inventors: Giacomo Gorni, Pavia (IT); Marc Romagnoli, Milan (IT); Luciano Socci, Milan (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 10/332,950

(22) PCT Filed: Jul. 5, 2001

(86) PCT No.: PCT/EP01/07735

§ 371 (c)(1),
(2), (4) Date: May 27, 2003

(87) PCT Pub. No.: WO02/06874

PCT Pub. Date: Jan. 24, 2002

(65) Prior Publication Data

US 2004/0091223 A1 May 13, 2004

Related U.S. Application Data

(60) Provisional application No. 60/219,695, filed on Jul. 21, 2000.

(30) Foreign Application Priority Data

Jul. 14, 2000 (EP) .............................. 00830495

(51) Int. Cl.[7] .............................. G02B 6/20; G02B 6/22
(52) U.S. Cl. ........................................ 385/125; 385/127
(58) Field of Search ................................ 385/122, 123, 385/125–127

(56) References Cited

U.S. PATENT DOCUMENTS 5,802,236 A * 9/1998 DiGiovanni et al. ........ 385/127
6,097,870 A * 8/2000 Ranka et al. ................ 385/127
6,577,801 B2 * 6/2003 Broderick et al. .......... 385/125
6,859,598 B2 * 2/2005 Hasegawa et al. .......... 385/127

OTHER PUBLICATIONS

I. Monro et al., "Holey Optical Fibers: An Efficient Modal Model", Journal of Lightwave Technology, vol. 17, No. 6, pp. 1093–1102, (Jun. 1999).

S.E. Barkou et al., "Dispersion Properties of Photonic Bandgap Guiding Fibers", Optical Fiber Communication Conference, (OFC '99), vol. 4, pp. 117–119, (1999).

P.J. Bennett et al., "Toward Practical Holey Fiber Technology: Fabrication, Splicing, Modeling, and Characterization", Optics Letters, vol. 24, No. 17, pp. 1203–1205, (Sep. 1999).

(Continued)

*Primary Examiner*—Rodney Bovernick
*Assistant Examiner*—Omar Rojas
(74) *Attorney, Agent, or Firm*—Finnegan, Henderson, Farabow, Garrett & Dunner, L.L.P.

(57) ABSTRACT

A compensating optical fiber length having a negative chromatic dispersion slope, the compensating optical fiber having a core region surrounded by a cladding region, the cladding region defining a first ring of holes, which substantially defines, around the core region an annulus with an inner radius r1 and an outer radius r2, and at least one second ring of holes that surrounds the first ring of holes, the holes running along the compensating optical fiber longitudinally and being spaced apart from each other substantially according to a predefined pitch $\Lambda$, wherein a) $r1 \leq \lambda/n \leq r2$ where n is the refractive index of the material making up the core region of the compensating optical fiber length; b) the holes of the first and the at least one second ring are substantially of the same diameter d; and c) the ratio $d/\Lambda$ substantially satisfies the following relationship (A) $0.8 \leq d/\Lambda < 1$.

16 Claims, 5 Drawing Sheets

OTHER PUBLICATIONS

T. Kashiwada et al., "Broadband Dispersion Compensating Module Considering Its Attenuation Spectrum Behavior For WDM System", OFC, WM12, pp. 229–231 (1999).

G.E. Berkey et al., "Negative Slope Dispersion Compensating Fibers", OFC, WM14, pp. 235–237 (1999).

L.Gruner–Nielsen et al., "Design and Manufacture of Dispersion Compensating Fibre For Simultaneous Compensation of Dispersion and Dispersion Slope", OFC, Technical Digest WM13, pp. 232–234 (1999).

D. Mogilevtsev et al., "Group–Velocity Dispersion in Photonic Crystal Fibers", Optics Letters, vol. 23, No. 21, pp. 1662–1664, (Nov. 1998).

T.A. Birks et al., "Dispersion Compensation Using Single–Material Fibers", IEEE Photonics Technology Letters, vol. 11, No. 6, pp. 674–676, (Jun. 1999).

T.M. Monro et al., "Holey Fibers With Randomly Arranged Air Holes". CLEO 2000, San Francisco, USA, pp. 607–608 (May 2000).

A. Ferrando et al., "Full–Vector Analysis of a Realistic Photonic Crystal Fiber", Optics Letters, vol. 24, No. 5, pp. 276–278, (Mar. 1999).

E. Silvestre et al., "Biorthonormal–Basis Method for the Vector Description of Optical–Fiber Modes", Journal of Lightwave Technology, vol. 16, No. 5, pp. 923–928 (May 1998).

* cited by examiner

DEVICE FOR THE COMPENSATION OF CHROMATIC DISPERSION

CROSS REFERENCE TO THE RELATED APPLICATIONS

This application is a national phase application based on PCT/EP01/07735, filed Jul. 5, 2001, the content of which is incorporated herein by reference, and claims the priority of European Patent Application No. 00830495.8, filed Jul. 14, 2000, the content of which is incorporated herein by reference, and claims the benefit of U.S. Provisional Application No. 60/219,695, filed Jul. 21, 2000, the content of which is incorporated herein by reference.

BACKGROUND OF THE INVENTION

1. Field of the Invention

The present invention relates to a device for the compensation of chromatic dispersion comprising a compensating optical fibre with a core region surrounded by a cladding region in which a plurality of holes is present which run along the compensating optical fibre longitudinally.

Furthermore, the present invention also relates to an optical communication line comprising a transmission optical fibre length having, at a wavelength $\lambda$, a positive chromatic dispersion slope $s_t$ and/or a positive chromatic dispersion coefficient $D_t$ and a compensating optical fibre length with a negative chromatic dispersion slope $s_c$ and/or a negative chromatic dispersion coefficient $D_c$.

Furthermore, the present invention also relates to an optical communication system comprising such an optical communication line and a method for designing a compensating optical fibre so that, at a predefined wavelength $\lambda$, it has a negative chromatic dispersion slope $s_c$ and/or a negative chromatic dispersion coefficient $D_c$.

Throughout the present description and claims, the expression

"chromatic dispersion coefficient D" is used to indicate the first order dependency of the group velocity from the wavelength. In particular, the chromatic dispersion coefficient D is expressed as follows (Govind P. Agrawal, "Nonlinear Fiber Optics—Second Edition", Academic Press, pages 8–10)

$$D = \frac{d\beta_1}{d\lambda} = -\frac{2\pi c}{\lambda^2}\beta_2$$

where $\beta_1$ and $\beta_2$ are the constant of propagation of the mode of the first and, respectively, of the second order and D is expressed in ps/(nm*Km);

"slope of chromatic dispersion s" is used to indicate the derivative, with respect to the wavelength, of the chromatic dispersion coefficient D and is expressed in ps/(nm$^2$*Km); and "transmission optical fibre" is used to indicate an optical fibre used in a line or in an optical communication system for the transmission of optical signals from one point to another one located at a significant distance.

2. Description of the Related Art

As known, the optical fibres are commonly used in the field of optical telecommunications for the transmission of signals. Essentially they comprise an inner cylindrical region, called core, within which a signal is transmitted and an outer annular region, called cladding. The cladding has a refractive index lower than that of the core in order to confine the signal transmitted within the latter.

Typically, the core and the cladding are made from a silica based vitreous material and the difference in the refractive index between the core and the cladding is obtained by incorporating suitable additives (dopants) in the vitreous matrix of the core and/or of the cladding.

In the field of optical telecommunications and the propagation of an optical signal in an optical fibre, the chromatic dispersion (or second order dispersion), defined by the above-mentioned coefficient D, is a phenomenon for which different spectral components of a pulse of light that propagates in an optical fibre travel at different speeds causing a time spreading of the pulse.

In an optical communication system, the chromatic dispersion limits, therefore, the maximum data transmission speed (that is, the bit rate) or the maximum length of a link without electrical regeneration of the signal.

Furthermore, chromatic dispersion is a phenomenon that depends on the wavelength so that pulses of light at different wavelength propagate in an optical fibre at different speeds.

This last phenomenon, known as dispersion of the third order or chromatic dispersion slope (or "slope") is a problem in wavelength division multiplexing (WDM) optical communication system in which the information is transported along the same optical fibre by a plurality of optical signals at different wavelengths.

In the WDM optical communication systems, therefore, it is necessary to compensate not only the chromatic dispersion but also the chromatic dispersion slope in the range of wavelengths of interest.

Devices to compensate the chromatic dispersion as well as the chromatic dispersion slope of a conventional single mode fibre (SMF) are known.

For example, devices are already known that comprise an optical fibre suitably designed to have values of the chromatic dispersion coefficient D and of the chromatic dispersion slope that are very high and of an opposite sign with regards to those of the SMF optical fibre for which dispersion compensation is required.

Since the SMF optical fibres have a chromatic dispersion coefficient D and a chromatic dispersion slope s that are positive, the devices to compensate the dispersion, typically, have negative chromatic dispersion coefficient and chromatic dispersion slope.

T. Kashiwada et al. ("*Broadband dispersion compensating module considering its attenuation spectrum behaviour for WDM system*", OFC '99, WM12, pages 229–231) describe an optical fibre, to compensate the dispersion of a SMF optical fibre with a W refractive index profile designed in order to obtain negative values of the chromatic dispersion coefficient D and of the chromatic dispersion slope so as to compensate the positive values of the SMF fibre.

G. E. Berkey et al. ("*Negative slope dispersion compensating fibers*", OFC '99, WM14, pages 235–237) describe an optical fibre, to compensate the dispersion of a SMF optical fibre, with a refractive index profile designed in order to obtain negative values of the chromatic dispersion coefficient D and of the chromatic dispersion slope s in order to compensate the positive values of the SMF fibre.

L. Gruner-Nielsen et al. ("Design and manufacture of dispersion compensating fibre for simultaneous compensation of dispersion and dispersion slope", OFC '99, Technical Digest WM13, pages 232–234), describe an optical fibre, to compensate the dispersion of a SMF optical fibre, with a depressed cladding and designed to obtain negative values of the chromatic dispersion coefficient D and of the chromatic dispersion slope s in order to compensate the positive values of the SMF fibre.

Furthermore, in the last few years the dispersion properties of a holey optical fibre have been studied.

A holey optical fibre is an optical fibre typically made of a single type of material in which the difference in the refractive index between the core and the cladding, which provides a guided propagation, is achieved through the presence of holes in the cladding which reduce the refractive index of the material from which the fibre is made.

In particular, a holey optical fibre has a cladding region comprising holes that run along the entire length of the fibre and a core region determined by the absence of at least one hole in the material.

The U.S. Pat. No. 5,802,236 describes a micro-structured optical fibre which includes a solid silica core region surrounded by a inner cladding region and an outer cladding region. The cladding region has capillary holes that extend in the axial direction of the fibre. The holes in the outer cladding region are of a smaller diameter than the holes in the inner cladding region and therefore the effective refractive index of the outer cladding region is greater than the effective refractive index of the inner cladding region. This document states that this type of fibre may have high negative values of the chromatic dispersion coefficient D (for example, values that are more negative than −300 ps/nm*Km) at a predetermined wavelength (for example, 1550 nm) and high negative values of the chromatic dispersion slope s so that the fibre can carry out a dispersion compensation in a range of wavelengths of 20 nm or more. Furthermore, a micro-structured optical fibre is described in which the holes of the outer cladding region are of a diameter equal to 0.688 $\mu$m, the holes of the inner cladding region have a diameter equal to 0.833 $\mu$m and the centre to centre distance $\Lambda$ between the holes is 0.925 $\mu$m.

D. Mogilevtsev et al. ("*Group velocity dispersion in photonic crystal fibers*", Optics Letters, Vol. 23, No. 21, November 1998, pages 1662–1664) study the properties of dispersion of photonic crystal optical fibres and indicate that these fibres may have high values of normal (negative) chromatic dispersion coefficient D suitable to compensate the chromatic dispersion at 1550 nm.

S. E. Barkou et al. ("*Dispersion properties of photonic bandgap guiding fibers*", OFC '99, FG5, pages 117–119) investigate the dispersion properties of a holey fibre. They point out that, by changing the distance $\Lambda$ between two centres of two adjacent holes from 1.4 $\mu$m to 2.9 $\mu$m and in the range of wavelengths between 1.2 and 1.7 $\mu$m, very high positive values of the chromatic dispersion coefficient can be achieved. Furthermore, for a value of $\Lambda$ equal to 2.9 $\mu$m they point out that a very flat dispersion curve can be achieved with a dispersion value approximately equal to zero at 1550 nm. Therefore, the Authors conclude that the holey optical fibres have dispersion characteristics very different from the conventional ones, that may be designed for flat, non-zero dispersion over a wide wavelength range and that may exhibit dispersion significantly above the material dispersion.

T. M. Monro et al. ("*Holey optical fibers: an efficient modal model*", Journal of Lightwave Technology, vol. 17, No. 6, June 1999, pages 1093–1102) describe a model for the propagation of light in holey optical fibres. With this model the Authors obtain a curve of the chromatic dispersion coefficient as a function of wavelength for $\Lambda$ being equal to 2.3 and values of the ratio d/$\Lambda$ (where d is the diameter of the holes) equal to 0.1, 0.2 and 0.3. They indicate that as the hole size is increased, the dispersion value induced by the holes increases (as when the holes are small the chromatic dispersion is dominated by the material dispersion).

T. A. Birks et al. ("*Dispersion compensation using single-material fibers*", IEEE Photonics Technology Letters, Vol. 11, No. 6, June 1999, pages 674–676) propose a model for the propagation of light in holey optical fibres according to which they approximate a holey fibre with holes of a large diameter with a fibre made up of a silica core in air. Through the use of this model, the authors calculate that such fibres may have, at 1550 nm, a negative value of the chromatic dispersion coefficient of −2000 ps/(nm*Km) in order to compensate for a conventional optical fibre with a length 100 times greater. Furthermore, they calculate that such fibres may have, at 1550 nm, a chromatic dispersion slope of −2.3 ps*nm$^{-2}$*Km$^{-1}$ with a negative chromatic dispersion value of −680 ps/(nm*Km) so that they may compensate a conventional optical fibre with a length 55 times greater over a 100 nm band centred around 1550 nm. Therefore, the Authors conclude that such fibres have great potential for the compensation of chromatic dispersion.

T. M. Monro et al. ("*Holey fibers with randomly arranged air holes*", CLEO 2000, San Francisco (USA), 7–12 May 2000, CFJ2 page 670) present a discussion aimed at illustrating that the light may be guided in a holey optical fibre with air holes arranged randomly. They also indicate that in a holey fibre the d/$\Lambda$ ratio determines a range of possible dispersion values and that when the holes are large they can obtain high coefficient values of chromatic dispersion that may be normal (negative) or anomalous (positive).

A holey optical fibre may be produced by forming a preform starting from a bundle of empty tubes arranged according to a predetermined structure in which the central tube is replaced by a solid bar which will make up the core region of the fibre. The preform achieved in this way is then spinned in order to achieve a holey optical fibre with holes of diameter d and pitch $\Lambda$. The spinning process generally allows for the initial structure of the arrangement of the tubes in the preform to remain almost unchanged and, therefore, to achieve the desired value of pitch $\Lambda$ with a high level of precision.

However, with regards to the diameter d of the holes, the Applicant has noted that during the spinning process of the preform, the diameter of the tubes may vary so that it is not be possible to achieve with as much precision the desired value of the diameter d (and, therefore of the ratio d/$\Lambda$).

SUMMARY OF THE INVENTION

The Applicant, therefore, has noted that the ratio d/$\Lambda$ is a critical parameter in the production process of an optical fibre.

The Applicant, therefore, has faced the technical problem of providing an optical communication line with a holey compensating optical fibre with negative dispersion features stable with respect to the variations of the parameter d/$\Lambda$.

Therefore, in a first aspect the present invention relates to an optical communication line comprising a transmission optical fibre length with, at a wavelength $\lambda$, a positive chromatic dispersion slope $s_t$;

a compensating optical fibre length, associated to said transmission optical fibre length, with a negative chromatic dispersion slope $s_c$ suitable to compensate, at least partly, the positive chromatic dispersion slope $s_t$ of the transmission fibre, said compensating optical fibre having a core region surrounded by a cladding region, the cladding region defining a first ring of holes, which substantially defines, around the core region, an annulus with an inner radius r1 and an outer radius r2, and at least one second ring of holes that surrounds the first ring of holes, said holes running along the compensating optical fibre longitudinally and being spaced apart from each other substantially according to a predefined pitch Λ, in which a) the values of said inner radius r1 and said outer radius r2 are selected in such a way that the wavelength in the means, λ/n, is included in the range of values defined by r1 and r2, that is to say in such a way that the following relationship (L) is substantially satisfied $$r1 \leq \lambda/n \leq r2$$

wherein n is the refractive index of the material making up the core region of said compensating optical fibre length b) the holes of said first and said at least one second ring are substantially of the same diameter d, and c) the ratio d/Λ substantially satisfies the following relationship (A)

$$0.8 \leq d/\Lambda < 1.$$

The Applicant, in fact, has found that a compensating optical fibre according to the invention, in which the first ring of holes defines an annulus with radiuses r1 and r2 such that the wavelength λ/n is comprised between the values r1 and r2, has a negative chromatic dispersion slope $s_c$ suitable to compensate at least in part the positive chromatic dispersion slope $s_t$ of the transmission fibre.

Furthermore, the Applicant has found that a compensating optical fibre having, according to the invention, a negative chromatic dispersion slope $s_c$, a first and at least one second ring of holes of a diameter d substantially equal and a ratio d/Λ≧0.8, has stable dispersion features with respect to modification of the parameter d/Λ. That is, the dispersion features of such a compensating optical fibre vary slowly upon variation of the parameter d/Λ.

This advantageously allows to achieve a compensating optical fibre with dispersion features that are not very sensitive to variations, due to the production process, of the parameter d/Λ with respect to the desired value.

Furthermore, a compensating optical fibre having, according to the invention, a first and at least one second ring of holes with a diameter substantially equal advantageously allows to simplify the production process of the fibre.

Moreover, the Applicant noted that in a compensating optical fibre according to the invention the diameter d of the holes that allows to achieve dispersion features useful for practical applications in optical communication lines and systems is relatively high.

Preferably, the value of d is comprised between approximately 0.75 and 1.1 μm. More preferably, the value of d is comprised between approximately 0.8 and 1.1 μm.

Relatively high values of the diameter d advantageously allow for the semplification of the production process of the compensating fibre. Furthermore, they allow for the achievement of relative long lengths of compensating fibre (typically in the order of a few kilometers) without the risk of collapse of the holes.

Advantageously, the value of Λ substantially satisfies the following relationship (C)

$$\frac{\lambda}{n} * \frac{1}{1 + \frac{1}{2}\left(\frac{d}{\Lambda}\right)} \leq \Lambda \leq \frac{\lambda}{n} * \frac{1}{1 - \frac{1}{2}\left(\frac{d}{\Lambda}\right)}$$

The Applicant has in fact found that the above-mentioned relationship (L) is satisfied when the pitch Λ substantially satisfies the above-mentioned relationship (C).

Preferably, the ratio d/Λ substantially satisfies the following relationship $$0.9 \leq d/\Lambda < 1.$$

The Applicant has in fact verified that the stability of the dispersion features of the compensating fibre increase for a value of the ratio d/Λ comprised between 0.9 and 1.

Furthermore, for a value of the ratio d/Λ comprised between 0.9 and 1, the Applicant has verified that the compensation efficiency of the compensating optical fibre length typically increases.

Advantageously, said wavelength λ is comprised between approximately 1300 nm and 1700 nm. Preferably, it is comprised between 1450 and 1600 nm. More preferably, it is comprised within the third transmission band of the optical fibres (that is between 1500 and 1600 nm). Even more preferably, it is comprised within the typical transmission band of an optical amplifier doped with erbium (that is between 1530 and 1600 nm).

The compensating optical fibre length is placed within, upstream or, advantageously, downstream said transmission optical fibre length.

Typically, the transmission optical fibre length has a length $L_t$;

the compensating optical fibre length has a length $L_c$; and the value of said length $L_c$ and of said chromatic dispersion slope $s_c$ of said compensating optical fibre length are such that the product $s_c*L_c$ is substantially equal to the product $-s_t*L_t$ in order to compensate the chromatic dispersion slope of the transmission optical fibre length.

This allows to achieve an optical communication line with a chromatic dispersion substantially constant with respect to wavelength and is particularly advantageous in the case of a WDM optical communication line suitable to transmit a plurality of signals having different wavelengths.

Preferably, the value of Λ satisfies the following relationship (D)

$$\Lambda(\mu m) = 0.4 + \frac{0.44}{d/\Lambda} \pm 0.02 \ \mu m$$

in order to achieve a negative value of the chromatic dispersion slope $s_c$ suitable to efficiently compensate the chromatic dispersion slope of said transmission optical fibre length.

The Applicant has found that the above-mentioned relationship D allows to achieve, within the values of Λ contemplated by the above-mentioned relationship C, an optimal value of Λ corresponding to a high absolute value of the chromatic dispersion slope $s_c$. This, advantageously, allows to compensate the dispersion $s_t*L_t$ of the transmission optical fibre length with a short length $L_c$ of the compensating optical fibre length.

Typically, in said optical communication line
the transmission optical fibre length also has, at the wavelength λ, a positive chromatic dispersion coefficient $D_t$; and
the value of Λ substantially satisfies, advantageously, the following relationship (F)

$$\Lambda(\mu m) = \alpha * \frac{D_t}{s_t} + \beta \pm 0.02 \ \mu m,$$

where $$\alpha = -10^{-4} * \left(2.685 * \frac{d}{\Lambda} + 5.987\right) \text{ and } \beta = -3.4\left(\frac{d}{\Lambda} - 1\right)^3 + 1.18$$

The Applicant has in fact found that the above-mentioned relationship (F) makes sure that the compensating optical fibre length has such a chromatic dispersion coefficient $D_c$ and such a chromatic dispersion slope $s_c$ that the ratio $D_c/s_c$ is substantially equal to the ratio $D_t/s_t$. Advantageously, this allows to compensate the chromatic dispersion slope as well as the chromatic dispersion of the transmission optical fibre length.

Typically, said optical communication line also comprises an optical amplifier.

Preferably, said optical amplifier is placed downstream said compensating optical fibre length.

Advantageously, said amplifier is of the type provided with an active optical fibre doped with a rare earth.

Typically, said rare earth is erbium.

Typically, said core region of the compensating optical fibre length is made from a silica based vitreous material.

Typically, also said cladding region of the compensating optical fibre is made from a silica based vitreous material.

However, the core and the cladding regions are not necessarily made from the same material.

Typically the holes defined by the cladding region are filled with air. Alternatively, they are filled with another material with a refractive index below that of the material that makes up the core region. For example, such material is a gas. In particular, a gas that does not interact chemically with the material of the core and cladding regions.

Advantageously, said cladding region also defines at least one third ring of holes placed around said at least one second ring of holes.

Said rings of holes can be of any shape whatsoever. Typically, they are of a hexagonal shape. In general, they have a circular symmetry.

Typically, said transmission optical fibre length is a conventional optical fibre essentially consisting of a core and a cladding with a refractive index lower than that of the core in order to confine the signal transmitted within the latter.

Typically, the core and the cladding are made from a silica based vitreous material and the difference in the refractive index between the core and the cladding is obtained by incorporating suitable dopants (such as, for example, germanium, phosphorus and/or fluorine) in the vitreous matrix of the core and/or the cladding.

Typically said transmission optical fibre length is a conventional single mode optical fibre (SMF) produced, for example, by FOS or CORNING Inc.

Advantageously, said transmission optical fibre length is selected from the group comprising a True Wave™ (TF) optical fibre, a True Wave Plus™ (TW+) optical fibre, a True Wave RS™ (TW RS) optical fibre produced by LUCENT Technology Inc.; a large effective area optical fibre (or LEAF), a LEAF Enhanced optical fibre produced by CORNING Inc. and a Freelight™ optical fibre produced by FOS.

In a second aspect the present invention also relates to an optical communication system comprising a transmitting station suitable to supply an optical signal with a wavelength signal λ;

a receiving station suitable to receive said optical signal;

an optical communication line, optically connected to said transmitting station and said receiving station, to transmit said optical signal, said line including at least one transmission optical fibre length, having at a wavelength λ a positive chromatic dispersion slope $s_t$, and a compensating optical fibre length, associated to said transmission optical fibre length, with a negative chromatic dispersion slope $s_c$ suitable to compensate at least in part the positive chromatic dispersion slope $s_t$ of the transmission fibre, said compensating optical fibre having a core region surrounded by a cladding region, the cladding region defining a first ring of holes, which substantially defines, around the core region, an annulus with an inner radius r1 and an outer radius r2 and at least one second ring of holes that surrounds the first ring of holes, said holes running along the compensating optical fibre longitudinally and being spaced apart from each other substantially according to a predefined pitch Λ, in which a) the values of said inner radius r1 and said outer radius r2 are selected in such a way as to satisfy the following relationship (L)

$$r1 \leq \lambda/n \leq r2$$

wherein n is the refractive index of the material making up the core region of said compensating optical fibre length, b) the holes of the said first and said at least one second ring are substantially of the same diameter d, and c) the ratio d/Λ substantially satisfies the following relationship (A)

$$0.8 \leq d/\Lambda < 1.$$

Advantageously, said optical signal is a WDM optical signal comprising a plurality of N signals having wavelengths λ1, λ2 . . . λN.

With regards to the structural and functional features of said optical communication line, of said fibre transmission length and of said compensating optical fibre length reference shall be made to what already described above.

In a third aspect thereof the present invention also relates to a method for the design of a compensating optical fibre so that it has, at a predefined wavelength λ, a negative chromatic dispersion slope $s_c$, said compensating optical fibre having a core region surrounded by a cladding region, the cladding region defining a first ring of holes, that substantially defines, around the core region, an annulus with an inner radius r1 and an outer radius r2, said holes running along the compensating optical fibre longitudinally, having a diameter d and being substantially spaced apart from each other according to a predefined pitch Λ, said method including the steps of a) selecting a value of the ratio d/Λ through the following relationship (B)

$$0.5 \leq d/\Lambda < 1, \text{ and}$$

b) selecting the values of said inner radius r1 and said outer radius r2 in such a way that the following relationship (L) is substantially satisfied $$r1 \leq \lambda/n \leq r2$$

wherein n is the refractive index of the material making up the core region of said compensating optical fibre.

Advantageously, step b) is carried out by selecting the value of $\Lambda$ by means of the following relationship (C)

$$\frac{\lambda}{n} * \frac{1}{1 + \frac{1}{2}\left(\frac{d}{\Lambda}\right)} \leq \Lambda \leq \frac{\lambda}{n} * \frac{1}{1 - \frac{1}{2}\left(\frac{d}{\Lambda}\right)}$$

and once the value of $\Lambda$ has been selected, the value of d is determined by the value of the ratio d/$\Lambda$ selected in step a).

Preferably, step b) is carried out by selecting the value of $\Lambda$ by means of the following relationship (D)

$$\Lambda(\mu m) = 0.4 + \frac{0.44}{d/\Lambda} \pm 0.02 \ \mu m$$

in such a way as to achieve an efficient compensating optical fibre.

When it is required to design the compensating optical fibre so that it has a negative chromatic dispersion coefficient $D_c$ and so that it is capable of compensating a positive chromatic dispersion coefficient $D_t$ and a positive chromatic dispersion slope $S_t$, step b) is carried out by selecting the value of $\Lambda$ in order to satisfy the following relationship (E)

$$\Lambda(\mu m) = \alpha * \frac{D_t}{S_t} + \beta \pm 0.02 \ \mu m \text{ where}$$

$$\alpha = -10^{-4} * \left(2.685 * \frac{d}{\Lambda} + 5.987\right)$$

$$\beta = 3.14 * \left(\frac{d}{\Lambda}\right)^2 - 5.162 * \frac{d}{\Lambda} + 3.3476 \quad \text{for } 0.5 \leq d/\Lambda < 0.7$$

$$\beta = -3.4\left(\frac{d}{\Lambda} - 1\right)^3 + 1.18 \quad \text{for } 0.7 \leq d/\Lambda < 1$$

in such a way that the chromatic dispersion coefficient $D_c$ and the chromatic dispersion slope $s_c$ of said compensating optical fibre are such that the ratio $D_c/s_c$ is substantially equal to the ratio $D_t/s_t$.

Preferably, the ratio d/$\Lambda$ substantially satisfies the following relationship $$0.7 \leq d/\Lambda < 1.$$

More preferably, the ratio d/$\Lambda$ substantially satisfies the following relationship $$0.8 \leq d/\Lambda < 1.$$

Preferably, the value of d is comprised between approximately 0.75 and 1.1 $\mu m$. More preferably, the value of d is comprised between approximately 0.8 and 1.1 $\mu m$.

Advantageously, said wavelength $\lambda$ is comprised between approximately 1300 nm and 1700 nm. Preferably, it is comprised between 1450 and 1600 nm. More preferably, it is comprised in the third transmission band of the optical fibres (that is between 1500 and 1600 nm). Even more preferably, it is comprised in the typical transmission band of an optical amplifier doped with erbium (that is between 1530 and 1600 nm).

In a fourth aspect thereof the present invention also relates to a method for determining the parameters d and $\Lambda$ of a compensating optical fibre so that it has, at a predefined wavelength $\lambda$, a negative chromatic dispersion coefficient $D_c$, said compensating optical fibre having a core region surrounded by a cladding region, the cladding region defining a first ring of holes around the core region, said holes running along the compensating optical fibre longitudinally, having a diameter d and being spaced apart from each other substantially according to a predefined pitch $\Lambda$, said method including the steps of a) selecting a value of the ratio d/$\Lambda$ through the following relationship (G)

$$0.5 \leq d/\Lambda < 1,$$

b) selecting a value of $\Lambda$ through the following relationship (H)

$$\Lambda = \frac{\lambda}{n}\left(\frac{1}{1 + \frac{1}{2}\frac{d}{\Lambda}}\right) \pm 0.25 \ \mu m$$

wherein n is the refractive index of the material making up the core region of said compensating optical fibre and c) once the value of $\Lambda$ has been selected, determining the value of d through the value of the ratio d/$\Lambda$ selected in step a).

With regards to the ratio d/$\Lambda$, the diameter d and the wavelength $\lambda$, reference shall be made to what described above.

In a fifth aspect thereof the present invention also relates to a device for the compensation of the chromatic dispersion and/or the chromatic dispersion slope comprising a compensating optical fibre length comprising, in turn, a core region surrounded by a cladding region, the core region defining a first ring of holes, which substantially defines, around the core region, an annulus with an inner radius r1 and an outer radius r2, and at least one second ring of holes that surrounds the first ring of holes, said holes running along the compensating optical fibre longitudinally and being spaced apart from each other substantially according to a predefined pitch $\Lambda$, in which a) the values of said inner radius r1 and said outer radius r2 are such that they satisfy the following relationship (L)

$$r1 \leq \lambda/n \leq r2$$

wherein n is the refractive index of the material that makes up the core region of said compensating optical fibre length b) the holes of said first and said at least one second ring are substantially of the same diameter d, and c) the ratio d/$\Lambda$ substantially satisfies the following relationship (A)

$$0.8 \leq d/\Lambda < 1.$$

With regards to the features of said compensating optical fibre reference shall be made to what described above with regards to the compensating optical fibre length of the optical communication line of the invention.

In a further aspect thereof, the present invention also relates to a device for the compensation of the chromatic dispersion and/or the chromatic dispersion slope comprising a compensating optical fibre comprising, in turn, a core region surrounded by a cladding region, the cladding region defining a first ring of holes that surrounds the core region and at least one second ring of holes that surrounds the first ring of holes, said holes running along the compensating optical fibre longitudinally and being spaced apart from each other substantially according to a predefined pitch $\Lambda$, in which the holes of said first and said at least second ring are substantially of the same diameter d, the ratio $d/\Lambda$ substantially satisfies the following relationship (A)

$$0.8 \leq d/\Lambda < 1, \text{ and}$$

the value of $\Lambda$ is comprised between approximately 0.95 and 1.21 $\mu$m.

Advantageously, the value of $\Lambda$ is comprised between approximately 0.95 and 1.18 $\mu$m.

Advantageously, for a ratio $d/\Lambda$ equal to approximately 0.8, the value of $\Lambda$ is comprised between approximately 1 and 1.21 $\mu$m. Preferably, for a ratio $d/\Lambda$ equal to approximately 0.8, it is comprised between approximately 1 and 1.18 $\mu$m.

Advantageously, for a ratio $d/\Lambda$ comprised between approximately 0.9 and 1, the value of $\Lambda$ is comprised between approximately 0.96 and 1.18 $\mu$m. Preferably, for a ratio $d/\Lambda$ comprised between approximately 0.9 and 1, it is comprised between approximately 0.96 and 1.16 $\mu$m.

With regards to the features of said compensating optical fibre reference shall be made to what described above relating to the compensating optical fibre length of the optical communication line of the invention.

BRIEF DESCRIPTION OF THE DRAWINGS

Further features and advantages of the present invention will become clear from the following detailed description of a preferred embodiment, made with reference to the drawings attached. In such drawings.

DETAILED DESCRIPTION OF THE INVENTION

Figure 1:
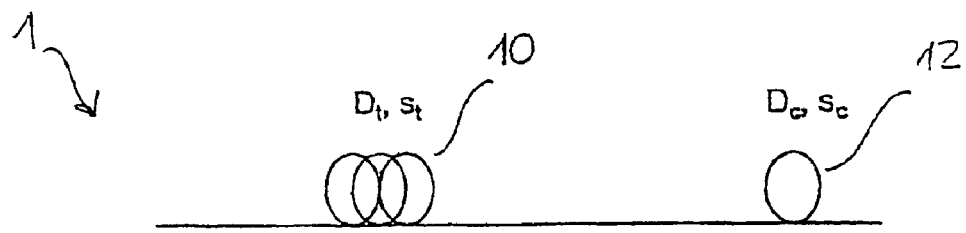
FIG. 1 illustrates a first embodiment of an optical communication line according to the invention.

FIG. 1 shows an optical communication line 1 according to the invention comprising a transmission optical fibre length 10 and a compensating optical fibre length 12, placed downstream the length 10.

The transmission optical fibre length 10 is a length of optical fibre conventionally used for telecommunications.

More in particular, it is a length of optical fibre comprising a core and a cladding, both of which are made from a silica based vitreous material, in which the difference in the refractive index between the core and the cladding is achieved by incorporating suitable dopants in the vitreous matrix and/or the cladding.

Typical examples of such kinds of optical fibres are, as already mentioned above, a SMF conventional optical fibre, a True Wave™ optical fibre, a True Wave Plus™ optical fibre, a True Wave RS™ optical fibre, a LEAF optical fibre, a LEAF Enhanced optical fibre and a FreeLight™ optical fibre.

At a wavelength $\lambda$, the transmission optical fibre length 10 has a positive chromatic dispersion slope $s_t$.

Furthermore, it is of a length $L_t$ that can range from a few kilometers to a few hundred kilometers. Typically, its length $L_t$ is between 30–200 Km.

Figure 4:
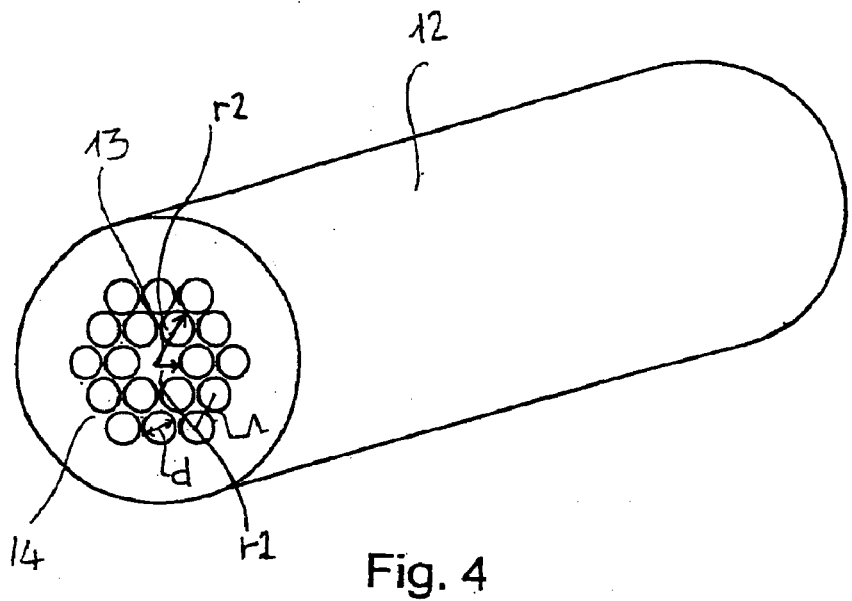
FIG. 4 illustrates a schematic representation of an embodiment of a compensating optical fibre length according to the invention.

The compensating optical fibre length 12 is a length of holey optical fibre having a core region 13 and a cladding region 14 that surrounds the core region 13 (FIG. 4).

The cladding region 14 comprises, for example, two rings of holes that surround that core region 13.

In the embodiment illustrated in FIG. 4, the two rings of holes are of a hexagonal shape.

The holes run along the compensating optical fibre length 12 lengthwise for the entire length.

Furthermore, in the embodiment illustrated, the core region 13 and the cladding region 14 are both made up of a silica based vitreous material and the holes are filled with air.

The holes of the two rings are of a substantially equal diameter and are spaced apart from each other by a pitch $\Lambda$.

The compensating optical fibre length 12 can be produced according to a known method such as, for example, the one described by the U.S. Pat. No. 5,802,236.

According to the method of the invention, the compensating optical fibre length 12 can be designed in such a way as to have, at the wavelength $\lambda$, a negative chromatic dispersion slope $s_c$ and compensate at least in part the positive chromatic dispersion slope $s_t$ of the transmission optical fibre length 10.

More in particular, in order that the compensating optical fibre length 12 has, at the wavelength $\lambda$, a negative chromatic dispersion slope $s_c$, it must be designed in such a way that the parameters d and $\Lambda$ substantially satisfy the above mentioned relations B and C:

$$-0.5 \leq d/\Lambda < 1 \tag{B}$$

$$-\frac{\lambda}{n} * \frac{1}{1+\frac{1}{2}\left(\frac{d}{\Lambda}\right)} \leq \Lambda \leq \frac{\lambda}{n} * \frac{1}{1-\frac{1}{2}\left(\frac{d}{\Lambda}\right)} \quad (C)$$

where $\lambda$ is the wavelength in the vacuum, n is the refractive index of the material that makes up the core region 13 (and the cladding region 14 when it is made up of the same material of the core region 13) of the compensating optical fibre length 12 and $\lambda/n$ is the wavelength in the propagation means.

The Applicant has verified that the relationship C is in full agreement with the corresponding values of $\Lambda$ that are achieved by resolving the Maxwell equations in an range of wavelengths comprised between 1300 and 1700 nm.

More in particular, the relationship C provides an excellent approximation of the values of $\Lambda$ (with a margin of error in the order of a few nm) around the wavelength of 1550 nm, for a material with a refractive index n approximately equal to that of the silica (approximately 1.45) and for a value of $d/\Lambda$ of at least approximately 0.7.

The compensating optical fibre 12 designed in this way has a negative chromatic dispersion slope $s_t$ suitable to compensate, at least in part, the positive chromatic dispersion slope of the transmission optical fibre length 10.

For example, considering
a wavelength $\lambda$ of 1550 nm,
a ratio $d/\Lambda$ equal to 0.8,
a refractive index n equal to 1.45 (approximately equal to the refractive index of the silica at 1550 nm), the compensating optical fibre 12 designed according to the method of the invention has a negative chromatic dispersion slope $s_c$ for a value of $\Lambda$ included between approximately 0.76 $\mu$m and approximately 1.78 $\mu$m.

Once the value of $\Lambda$ has been selected within such interval, the value of d is determined by the relationship $d/\Lambda=0.8$.

Figure 5:
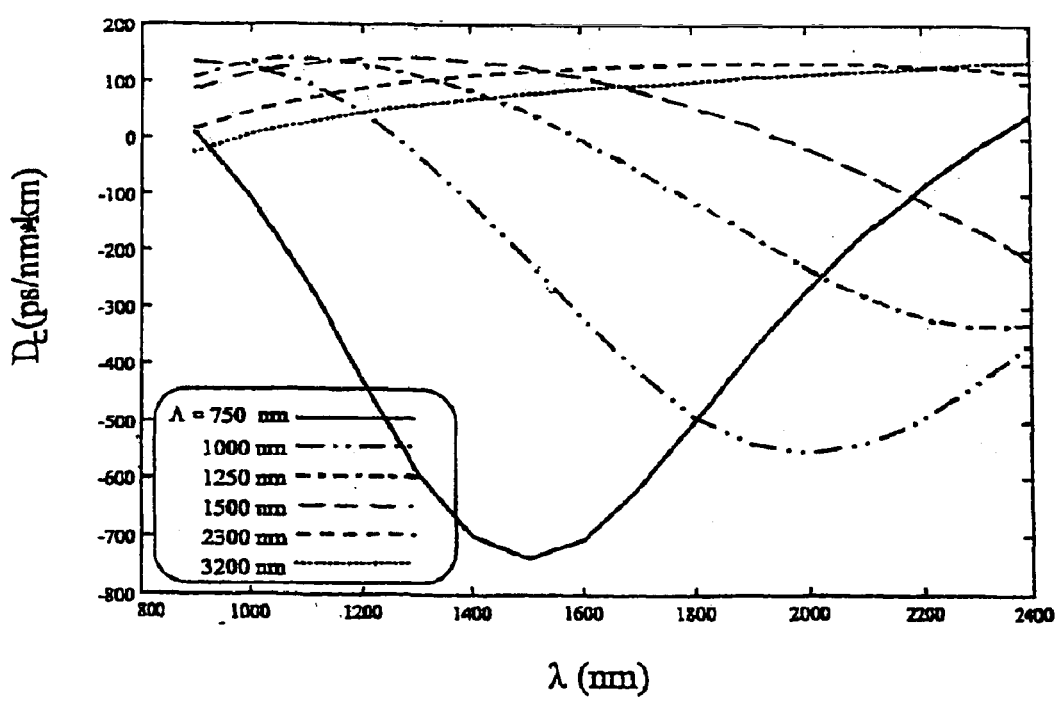
FIG. 5 illustrates the pattern of the chromatic dispersion coefficient $D_c$ of a compensating optical fibre length of the line of FIG. 1 with respect to the wavelength $\lambda$ and the value of the parameter $\Lambda$ for a ratio $d/\Lambda$ equal to 0.8.

FIG. 5 illustrates the pattern of the chromatic dispersion coefficient $D_c$ (expressed in ps/(nm*Km)) of the compensating optical fibre length 12 with respect to the wavelength $\lambda$ and the value of the parameter $\Lambda$ for $d/\Lambda=0.8$.

Such a pattern has been determined by resolving the vectorial Maxwell equations of the propagation of light in a holey optical fibre as described, for example, by Ferrando et al. (*"Full-vector analysis of realistic photonic crystal fiber"*, Optics Letters, Vol. 24, No. 5, March 1999, pages 276–278) and by Silvestre et al. (*"Biothermal basis method for the vector description of optical fiber modes"*, Journal of Lightwave Technology, Vol. 16, No. 5, pages 923–928).

From the pattern of the chromatic dispersion coefficient $D_c$ of FIG. 5 an excellent correspondence between the values of $\Lambda$ found according to the invention in conformity with the above-mentioned relationship C, to achieve a negative chromatic dispersion slope at a wavelength of 1550 nm, and those found by resolving the Maxwell equations can be noted.

Furthermore, according to the method of the invention it is also possible to determine the value of $\Lambda$ which, within the range of values found with the relations B and C, allows for the optimisation of the value of the chromatic dispersion slope $s_c$ of the compensating optical fibre length 12. In other words, the value of $\Lambda$ which allows for the achievement of a high absolute value of $s_c$ in order to compensate the dispersion $s_t*L_t$ of the transmission optical fibre length 10 with a very short length $L_c$ of the compensating optical fibre length 12.

More in particular, in order to optimise the value of the negative chromatic dispersion slope $s_t$, the compensating optical fibre length 12 must be designed, according to the method of the invention, in such a way that the parameter $\Lambda$ satisfies, as well as the above-mentioned relations B and C, also the relationship (D):

$$\Lambda(\mu m) = 0.4 + \frac{0.44}{d/\Lambda} \pm 0.02 \ \mu m$$

The Applicant has verified that the relationship D is in full agreement with the corresponding values of $\Lambda$ that are achieved by resolving the Maxwell equations in a range of wavelengths between 1300 and 1700 nm.

More in particular, the relation $$\Lambda(\mu m) = 0.4 + \frac{0.44}{d/\Lambda}$$

provides an
excellent approximation of the values of $\Lambda$ (with a margin of error in the order of a few nm) around the wavelength of 1550 nm, for a material with a refractive index n approximately equal to that of the silica (approximately 1.45) and for a value of $d/\Lambda$ of at least 0.7.

For example, considering a ratio $d/\Lambda$ equal to 0.8, the value of $\Lambda$ which allows to optimise the negative chromatic dispersion slope $s_c$ of the compensating optical fibre length 12 is equal, according to the relations B–D of the method of the invention, to approximately 0.95 $\mu$m. According to the relationship $d/\Lambda=0.8$, this value of $\Lambda$ corresponds to a value of d equal to approximately 0.76 $\mu$m.

For a value of d equal to 0.76 $\mu$m, $\Lambda$ equal to 0.95 $\mu$m, $\lambda$ equal to 1550 nm and n equal to 1.45, we find that the compensating optical fibre length 12 has a chromatic dispersion slope $s_c$ equal to $-1.0869$ ps/(nm²*Km).

With this value of the chromatic dispersion slope $s_c$, in order to compensate the chromatic dispersion slope $s_t$ of the transmission optical fibre length 10 having length $L_t$, it is advantageous that the compensating optical fibre length 12 has a length $L_c$ equal to approximately $(L_t*s_t)/s_c$.

For example, in the case that the transmission optical fibre length 10 is a SMF fibre with a length $L_t$ equal to 100 Km's and a chromatic dispersion slope $s_t$ equal to 0.0677 ps/(nm²*Km), the length $L_c$ of the compensating optical fibre length 12 must be equal, according to the invention, to approximately 6.22 Km's.

Table 1 illustrates the typical values of $D_t$, $s_t$ and $D_t/s_t$ of the conventional SMF, TW™, TW+™, TW RS™, LEAF, LEAF Enhanced, Freelight™ optical fibres.

TABLE 1

| Type of fibre | $D_t$ @ 1550 nm ps/(nm*km) | $s_t$ @ 1550 nm ps/(nm²*km) | $D_t/s_t$ @ 1550 nm (nm) |
|---|---|---|---|
| SMF | 17.0 | 0.0677 | 251.1 |
| TW ™ | 2.4 | 0.0715 | 33.5 |
| TW + ™ | 4 | 0.0715 | 55.9 |
| TW RS ™ | 5.7 | 0.045 | 126.6 |
| LEAF | 3.7 | 0.105 | 35.2 |
| LEAF Enh. | 4.3 | 0.09 | 47.7 |
| FreeLight ™ | 4.2 | 0.08 | 52.5 |

Table 2 illustrates the optimal values of $\Lambda$, d and $L_c$ achieved by the relations B–D of the method of the invention for a value of $d/\Lambda$ equal to 0.8 to compensate in an efficient way the positive chromatic dispersion slope $s_t$ of the transmission optical fibre length 10 in the case that the length $L_t$ is equal to 100 Km and in the different cases in which it is made up of a SMF, TW™, TW+™, TW RS™, LEAF, LEAF Enhanced and Freelight™ optical fibre.

Furthermore, table 2 illustrates the values of $s_c$ achieved at 1550 nm, for a refractive index n equal to 1.45, in correspondence to the values of d and Λ of Table 2.

TABLE 2

| Type of fibre | Λ (μm) | d (μm) | $L_c$ (Km) | $s_c$ ps/($nm^2$*km) |
|---|---|---|---|---|
| SMF | 0.95 | 0.76 | 6.23 | −1.0869 |
| TW ™ | 0.95 | 0.76 | 6.58 | −1.0869 |
| TW + ™ | 0.95 | 0.76 | 6.58 | −1.0869 |
| TW RS ™ | 0.95 | 0.76 | 4.14 | −1.0869 |
| LEAF | 0.95 | 0.76 | 9.66 | −1.0869 |
| LEAF Enh. | 0.95 | 0.76 | 8.28 | −1.0869 |
| FreeLight ™ | 0.95 | 0.76 | 7.36 | −1.0869 |

The optical communication line 1 according to the invention can, therefore, compensate the chromatic dispersion slope not only of a conventional single mode optical fibre (SMF) but also of other transmission optical fibres such as, for example, those listed in table 2.

The optical communication lines 1 according to the invention can, therefore, have the chromatic dispersion slope $s_t$ of the transmission optical fibre length compensated in an efficient way.

Such lines can, for example, be used in a WDM optical communication system within which a constant chromatic dispersion is required with respect to the wavelength of the signals (that is an almost null chromatic dispersion slope).

In the case that a positive chromatic dispersion coefficient $D_t$ of the transmission optical fibre length 10 is also to be compensated, the communication line 1 also comprises a conventional device for the compensation of the chromatic dispersion made up of, for example, a conventional optical circulator associated to a suitable chirped optical fibre Bragg grating or a conventional optical fibre to compensate the chromatic dispersion.

Alternatively, in order to compensate also the chromatic dispersion of the transmission optical fibre length 10, the compensating optical fibre length 12 can be designed, according to the method of the invention, to compensate both the chromatic dispersion and the chromatic dispersion slope of the transmission optical fibre length 10.

It is known that in order to compensate both the chromatic dispersion coefficient $D_t$ and the chromatic dispersion slope $s_t$ it is necessary to satisfy both of the following relationships $$D_t*L_t+D_c*L_c=0$$

$$s_t*L_t+s_c*L_c=0$$

that is, it is necessary that the $D_t/s_t$ ratio is equal to the $D_c/s_c$ ratio.

According to the invention, to compensate a positive chromatic dispersion coefficient $D_t$ and a positive chromatic dispersion slope $s_t$ of the transmission optical fibre length 10, the compensating optical fibre length 12 must be designed in such a way that the parameters d and Λ satisfy, besides the relations B and C, also the following relationship (E):

$$\Lambda(\mu m) = \alpha * \frac{D_t}{s_t} + \beta \pm 0.02\ \mu m \text{ where}$$

$$\alpha = -10^{-4} * \left(2.685 * \frac{d}{\Lambda} + 5.987\right)$$

$$\beta = 3.14 * \left(\frac{d}{\Lambda}\right)^2 - 5.162 * \frac{d}{\Lambda} + 3.3476 \quad \text{for } 0.5 \leq d/\Lambda < 0.7$$

$$\beta = -3.4\left(\frac{d}{\Lambda} - 1\right)^3 + 1.18 \quad \text{for } 0.7 \leq d/\Lambda < 1$$

The Applicant has verified that the relationship E is in full agreement with the corresponding values of Λ that are achieved by resolving the Maxwell equations in a range of wavelength comprised between 1300 and 1700 nm.

More in particular, the relation $$\Lambda(\mu m) = \alpha * \frac{D_t}{s_t} + \beta$$

provides an excellent approximation of the values of Λ (with a margin of error in the order of a few nm's) around the wavelength of 1550 nm and for a material with a refractive index n equal to approximately that of the silica at 1550 nm (approximately 1.45).

Figure 7:
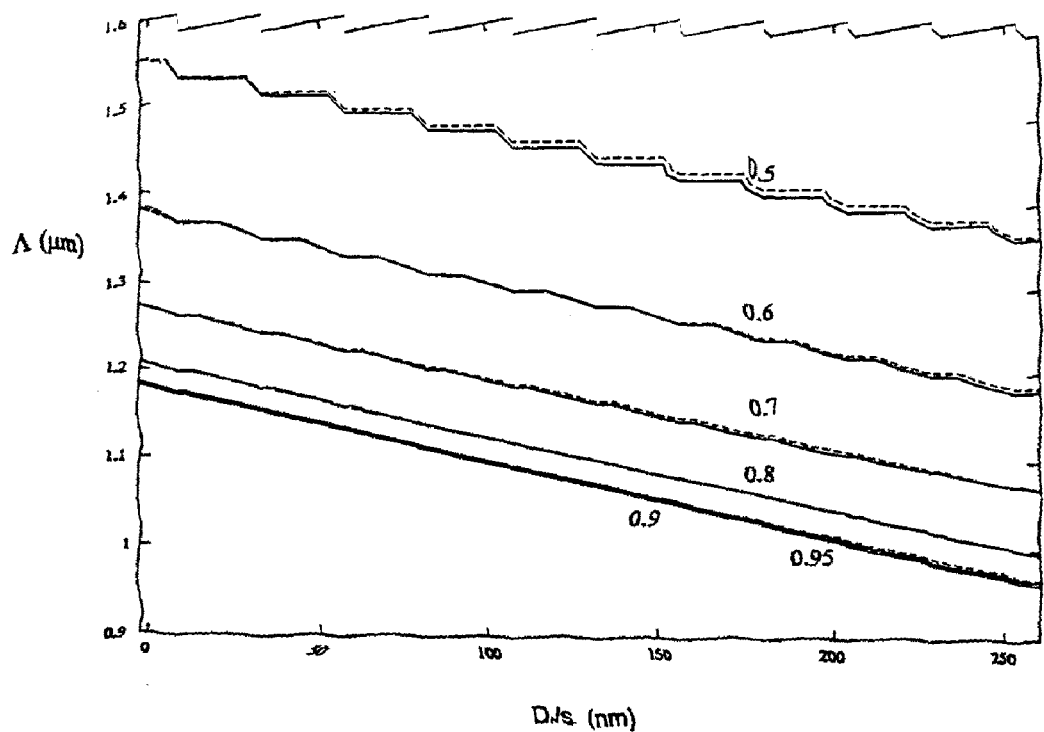
FIG. 7 illustrates the pattern of the parameter $\Lambda$ with respect to the ratio D/s, for different values of $d/\Lambda$ greater or equal to 0.5, achieved by resolving the Maxwell equations (full line) and according to the method of the invention (dotted line)

For example, FIG. 7 illustrates the pattern of Λ with respect to the ratio D/s, at different value of d/Λ, achieved through the relationship E of the method of the invention (dotted lines) and resolving the Maxwell equations (full lines) for a wavelength of 1550 nm and a refractive index n equal to that of the silica at 1550 nm (approximately 1.45).

The results achieved show an excellent correspondence between the values of Λ achieved according to the invention and resolving the Maxwell equations.

Furthermore, the results of FIG. 7 show how, for a compensating optical fibre 12 according to the invention, with a value of the ratio d/Λ greater or equal to 0.8, the variation in the ratio D/s is significantly stable with respect to the ratio d/Λ compared with the case of a ratio d/Λ lower than 0.8. Furthermore, such stability increases significantly for a ratio d/Λ equal to least 0.9.

Figure 10:
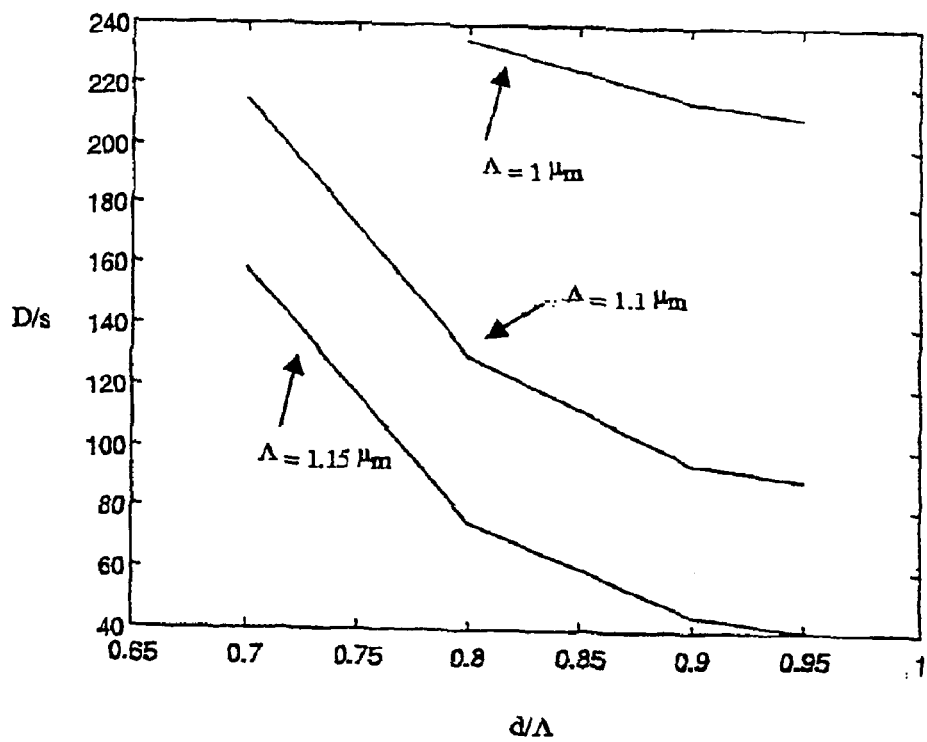
FIG. 10 illustrates the pattern of the ratio D/s with respect to the ratio $d/\Lambda$ for values of $\Lambda$ equal to 1, 1.1 and 1.15 $\mu$m of a compensating optical fibre designed according to the invention.

The stability of the ratio D/s with respect to the ratio d/Λ, for a value of the ratio d/Λ greater or equal to 0.8, is, furthermore, clear from FIG. 10 that illustrates the pattern of the ratio D/s (expressed in nm) with respect to the ratio d/Λ for a value of Λ equal to 1, 1.1 and 1.15 μm.

Furthermore, the Applicant has verified that the maximum variation of the ratio D/s for a compensating optical fibre according to the invention is only of approximately −520 nm for a variation in the ratio d/Λ from 0 to 1. That is, a maximum variation in the ratio D/s of only approximately −5.2 nm corresponds to a variation of 0.01 in the ratio d/Λ.

Furthermore, the Applicant has verified that a variation of 0.01 in the ratio d/Λ, around a value of d/Λ of 0.9, corresponds to a variation in the ratio D/s of only approximately −1.4 nm, while a variation of 0.01 of the ratio d/Λ, around a value of d/Λ of 0.95, corresponds to a variation of the ratio D/s only of approximately −0.75 nm.

Table 3 illustrates the values of Λ, d, $L_c$ achieved with the relations B, C and E of the method of the invention for a value of d/Λ equal to 0.8 to compensate both the chromatic dispersion slope $s_t$ and the chromatic dispersion coefficient $D_t$ of the transmission optical fibre length 10, in the case of length $L_t$ equal to 100 Km and in the different cases in which it is made up of a SMF, TW™, TW+™, TW RS™, LEAF, LEAF Enhanced and FreeLight™ optical fibre (the typical values of $D_t$, $s_t$ and $D_t/s_t$ of these optical fibres are illustrated in Table 1).

Furthermore, Table 3 illustrates the values of the ratio $D_c/s_c$ and of $D_c$ achieved at 1550 nm, for a refractive index n equal to 1.45 and in correspondence to the values of d and Λ of Table 3.

TABLE 3

| Type of fibre | Λ (μm) | d (μM) | $L_c$ (Km) | $D_c/s_c$ (nm) | $D_c$ ps/(nm*Km) |
|---|---|---|---|---|---|
| SMF | 1 | 0.8 | 6.4 | 257.45 | −266.81 |
| TW ™ | 1.18 | 0.94 | 8.8 | 43.008 | −27.218 |
| TW+ ™ | 1.16 | 0.92 | 7.8 | 74.369 | −51.298 |
| TW RS ™ | 1.1 | 0.88 | 5.2 | 133.87 | −108.59 |
| LEAF | 1.18 | 0.94 | 13.6 | 43.008 | −27.218 |
| LEAF Enh. | 1.16 | 0.93 | 11 | 58.875 | −38.911 |
| FreeLight ™ | 1.16 | 0.93 | 10.8 | 58.875 | −38.911 |

The optical communication line 1 according to the invention can, therefore, compensate both the chromatic dispersion slope and the chromatic dispersion not only of a conventional single mode fibre (SMF), with a $D_t/s_t$ ratio equal to approximately 251.1 nm, but also of other transmission optical fibres with a $D_t/s_t$ ratio lower than 150 nm as, for example, those listed in tables 1 and 3.

FIG. 8a illustrates the propagation delay (calculated with regards to the propagation time at 1550 nm) with respect to the wavelength λ along an optical communication line 1 including 100 Km of transmission optical fibre 10 of the SMF type and 6.4 Km of compensating optical fibre 12 according to the invention (having the values of d, Λ, $L_c$, $D_c/s_c$ and $D_c$ as of Table 3).

FIG. 8b illustrates an enlarged detail of FIG. 8a, in a range of wavelengths between 1500 and 1600 nm.

From this figure it can be noted how the maximum delay accumulated (with regards to the propagation time at the wavelength of 1550 nm) in the optical communication line according to the invention is only of approximately 430 ps in a range of wavelength of 100 nm.

Furthermore, in the range of wavelength between 1530 and 1570 nm, the maximum delay accumulated with regards to the propagation time at a wavelength of 1550 nm is only of approximately 60 ps.

The optical communication line 1 according to the invention is, therefore, efficiently compensated in terms of chromatic dispersion and also in terms of chromatic dispersion slope, in a range of wavelengths of approximately 100 nm.

Figure 9:
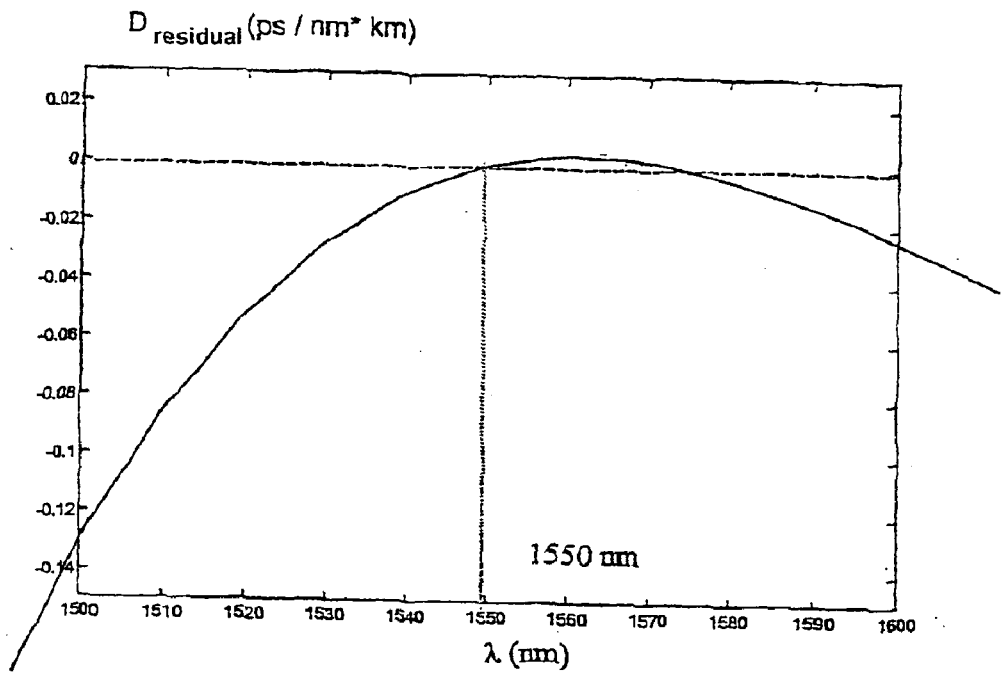
FIG. 9 illustrates the residual dispersion coefficient D of an optical communication line comprising 100 Km of optical fibre transmission of the SMF type and 6.4 Km of compensating optical fibre according to the invention for $d/\Lambda=0.8$.

FIG. 9 illustrates the residual dispersion coefficient D of the optical communication line 1 comprising 100 Km of transmission optical fibre 10 of the SMF type and 6.4 Km of compensating optical fibre 12 according to the invention (with values of d, Λ, $L_c$, $D_c/s_c$ and $D_c$ as per Table 3).

From the results of FIG. 9, the residual chromatic dispersion coefficient D of such line appears to be approximately $4.7*10^{-5}$ ps/(nm*Km) at 1550 nm, with a chromatic dispersion slope of approximately 0.00135 ps/(nm$^2$*Km).

Furthermore, between 1500 and 1600 nm, the maximum variation of the residual chromatic dispersion coefficient D of the line is, approximately 0.16 ps/(nm*Km), while between 1530 and 1570 nm it is of 0.055 ps/(nm*Km).

Considering that the dispersion typically tolerated in a WDM optical communication system, with a transmission format of the non-return to zero (NRZ) type at 40 Gbit/sec is of approximately 100 ps/nm, the compensating optical fibre 12 according to the invention allows to provide a WDM NRZ optical communication line, at 40 Gbit/sec, in the band of 1530–1570 nm, with a span length higher than approximately 1800 Km.

In order to compare the performances of a conventional compensating optical fibre with those of a compensating optical fibre according to the invention, the Applicant has compared the performances of a compensating optical fibre produced by Lucent Technologies (described in the above-mentioned article by L. Gruner-Nielsen et al., "Design and manufacture of dispersion compensating fibre for simultaneous compensation of dispersion and dispersion slope", OFC '99, Technical Digest WM13, pages 232–234)—with a W refractive index and suitable to compensate the dispersion of a single mode transmission optical fibre (SMF)—with those of the compensating optical fibre according to the invention, having the values of d and Λ (d≅0.8 μm and Λ≅1 μm) corresponding, in Table 3, to a SMF transmission fibre.

Table 4 illustrates the values of $D_c$, $s_c$, residual s after 100 Km of SMF transmission optical fibre and a suitable length of compensating fibre ($L_c=D_t*L_t/D_c$) and the maximum absolute value $D_{max}$ of the residual chromatic dispersion coefficient in a range of 1500–1600 nm and in a range of 1530–1750 nm.

TABLE 4

| Type of fibre | $D_c$ ps/nm*Km | $s_c$ ps/nm$^2$*Km | residual s ps/nm$^2$*Km | $D_{max}$ ps/nm*Km 1500–1600 nm | $D_{max}$ ps/nm*Km 1530–1570 nm |
|---|---|---|---|---|---|
| Conventional | −105.4 | −0.33 | $1.1E^{-3}$ | 0.5 | 0.087 |
| Invention | −266.8 | −1.04 | $6.5E^{-4}$ | 0.13 | 0.029 |

From the values of Table 4 we can see that the compensating optical fibre according to the invention is almost three times more efficient than a conventional compensating optical fibre.

Furthermore, as already mentioned above, the compensating optical fibre according to the invention can compensate for any type of transmission optical fibre and not only a SMF transmission optical fibre as a conventional compensating optical fibre.

Table 5 illustrates the values of Λ, d, $L_c$ achieved with relations B, C and E of the invention for a value of d/Λ equal to 0.9 to compensate the chromatic dispersion slope $s_t$ as well as the chromatic dispersion coefficient $D_t$ of the transmission optical fibre length 10, in the case of length $L_t$ equal to 100 Km's and in different cases in which it is made of a SMF, TW™, TW+™, TW RS™, LEAF, LEAF Enhanced and FreeLight™ optical fibre (the typical values of $D_t$, $s_t$ and $D_t/s_t$ of these optical fibres are illustrated in Table 1).

Furthermore, Table 5 illustrates the values of the ratio $D_c/s_c$ and of $D_c$ achieved at 1550 nm, for a refractive index n equal to 1.45 and in correspondence with the values of d and Λ of Table 5.

TABLE 5

| Type of fibre | Λ (μm) | d (μm) | $L_c$ (Km) | $D_c/s_c$ (nm) | $D_c$ ps/(nm*Km) |
|---|---|---|---|---|---|
| SMF | 0.97 | 0.87 | 4.78 | 256.5 | −355.5 |
| TW ™ | 1.15 | 1.04 | 9.41 | 34 | −25.5 |
| TW+ ™ | 1.13 | 1.01 | 6.22 | 75.7 | −64.3 |
| TW RS ™ | 1.07 | 0.96 | 3.91 | 140.7 | −145.5 |
| LEAF | 1.15 | 1.04 | 14.50 | 34 | −25.5 |
| LEAF Enh. | 1.14 | 1.02 | 8.49 | 62.1 | −50.6 |
| FreeLight ™ | 1.14 | 1.02 | 6.76 | 62.1 | −50.6 |

By comparing the values of $L_c$ of Table 5 achieved for a ratio of d/Λ equal to 0.9 with those of Table 3 achieved for a ratio of d/Λ equal to 0.8, it can be noted how, generally, as the ratio d/Λ increases the efficiency in compensation of the compensating optical fibre length 12 also increases.

In the case that the sole positive chromatic dispersion coefficient $D_t$ of the length of optical fibre transmission 10 is to be compensated, the compensating optical fibre length 12 can be designed, according to the method of the invention, to effectively compensate such chromatic dispersion coefficient $D_t$.

More in particular, in order that the compensating optical fibre length 12 has, at a wavelength λ, a high value of negative chromatic dispersion coefficient $D_t$, it must be designed in such a way that the parameters d and Λ satisfy the following relation:

$$-0.5 \leq d/\Lambda < 1 \qquad (G)$$

$$-\Lambda = \frac{\lambda}{n}\left(\frac{1}{1+\frac{1}{2}\frac{d}{\Lambda}}\right) \pm 0.25 \, \mu m \qquad (H)$$

where n is the refractive index of the material making up the core region 13 (and the cladding region 14 when it is made up of the same material of the core region 13) of the compensating optical fibre length 12.

The Applicant has verified that the relationship H is in full agreement with the corresponding values of Λ that are achieved by resolving the Maxwell equations in a range of wavelengths between 1300 and 1700 nm.

More in particular, the relation $$\Lambda = \frac{\lambda}{n}\left(\frac{1}{1+\frac{1}{2}\frac{d}{\Lambda}}\right)$$

provides an excellent approximation (with a margin of error in the order of a few nm's) of the value of Λ corresponding to a maximum negative value of $D_c$ around a wavelength of 1550 nm and for a value of d/Λ of at least approximately 0.7

For example, considering a wavelength λ of 1550 nm, a ratio d/Λ equal to 0.8, a refractive index n equal to 1.45 (equal to approximately the refractive index of silica at 1550 nm), the value of Λ which guarantees that the compensating optical fibre length 12 has a maximum negative value of the chromatic dispersion coefficient $D_c$ is equal approximately, according to the invention, to 0.76 μm.

The value of Λ thus found according to the method of the invention is in full agreement with the results of FIG. 5 achieved by resolving the Maxwell equations.

Once the value of Λ has been chosen within such range, the value of d can be determined by the relationship d/Λ=0.8.

Figure 2:
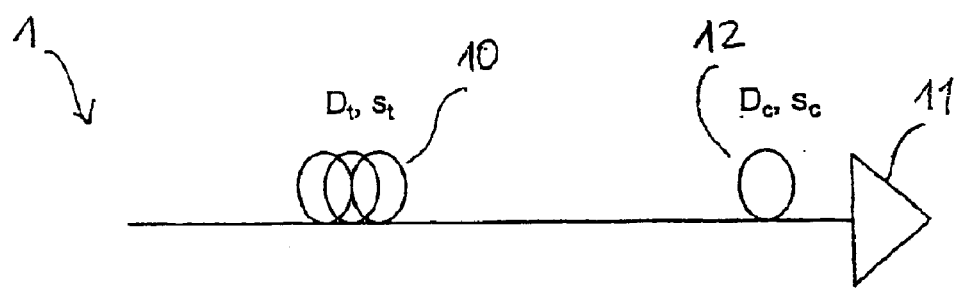
FIG. 2 illustrates a second embodiment of an optical communication line according to the invention.

According to an embodiment illustrated in FIG. 2, the optical communication line 1 includes, besides the two lengths of optical fibre 10 and 12 also an optical amplifier 11, located downstream the compensating optical fibre length 12.

Figure 6:
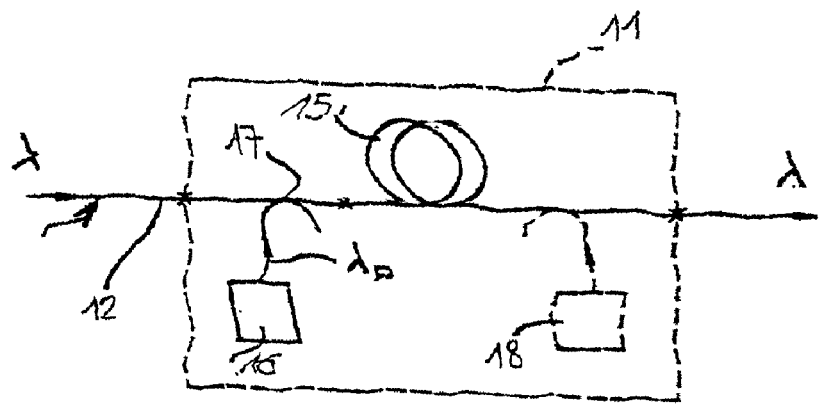
FIG. 6 illustrates an optical amplifier of the line and of the system of FIGS. 2 and 3.

As illustrated in FIG. 6, the optical amplifier 11 includes an erbium doped active optical fibre length 15 and a pumping source 16 (for example, a laser source) to pump the active optical fibre 15 at a pumping wavelength $\lambda_p$. The pumping source 16 is coupled to an input end of the active optical fibre 15 and to the compensating optical fibre length 12 by a wavelength selective coupler 17 (for example a fused fibre coupler) in such a way that the signal and pumping light propagate together through the fibre 15.

However, according to the necessities of the system, the pumping source 16 can also be coupled to the output end of the active fibre 15 (as indicated with a dotted line with 18) in such a way that the signal and pumping light propagate in opposite directions through the fibre 15.

Alternatively, each end of the fibre 15 can be coupled to a respective pumping source.

In the embodiment illustrated, the wavelength $\lambda_p$ of the pumping signal is equal to approximately 980 nm.

The optical amplifier 11 described may optionally comprise more than one stage of optical amplification.

Typically, according to a embodiment not illustrated, the optical communication line 1 of the invention comprises a plurality of transmission optical fibre lengths 10, a plurality of optical amplifiers 11 interposed between one length and another of transmission optical fibre 10 and at least one compensating optical fibre length 12 according to the invention to compensate at least in part the chromatic dispersion and/or the chromatic dispersion slope of the plurality of lengths of transmission optical fibre 10.

Such compensating optical fibre length 12 can be located at the beginning, at the end or within said optical communication line 1. Advantageously, it is inserted within the line 1 between one transmission optical fibre length 10 and an optical amplifier 11.

Figure 3:
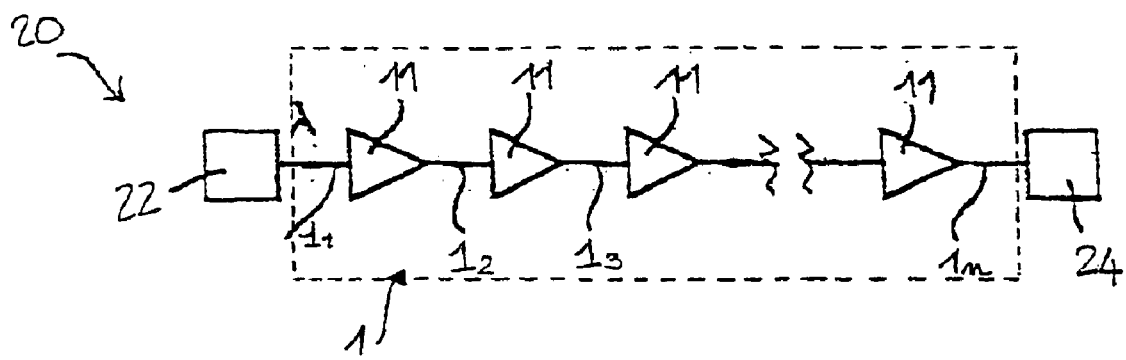
FIG. 3 illustrates an optical communication system according to the invention.

FIG. 3 illustrates an optical communication system 20 according to the invention comprising a transmitting station 22 to provide a signal at a signal wavelength λ, a receiving station 24 to receive such signal, and an optical communication line 1 according to the invention to transmit the signal from the transmitting station 22 to the receiving station 24.

According to a preferred embodiment, the optical communication system 20 is a WDM system.

In this case, the transmitting station 22 is a conventional WDM apparatus suitable to supply N optical signals with wavelengths λ1, λ2 ... λN different from each other, and to multiply them in wavelengths and to send them to the optical communication line 1.

Furthermore, the transmitting station 22 also comprises an optical power amplifier (booster)—not illustrated—to amplify the WDM optical signal before sending it along the line 1 (or a number of optical power amplifiers in parallel to amplify optical signals comprised in different bands of wavelengths).

Such wavelengths λ1, λ2 ... λN are advantageously selected within a range of wavelengths comprised between approximately 1500 nm and 1600 nm.

For example, the communication system 10 can be a WDM system with 128 channels spaced apart from each other of 50 GHz and divided up into three bands: 16 channels between 1529 and 1535 nm (first band); 48 channels between 1541 and 1561 nm (second band) and 64 channels between 1575 and 1602 nm (third band).

Said receiving station 24 comprises a conventional apparatus suitable to demultiplex said optical signals N and send them to any possible subsequent stages of processing. Furthermore, said receiving station 24 typically comprises also an optical pre-amplifier (not illustrated) suitable to bring the WDM optical signal to a level of power suitable to be received by the receiving apparatuses (or a number of optical pre-amplifiers in parallel to amplify the optical signals comprised in different bands of wavelengths).

Line 1 comprises a plurality of optical amplifiers 11, of the type described with reference to FIG. 6, to amplify a signal coming from an upstream length of line, in which the signal has been attenuated during its propagation along it, and to send it to a downstream length of line.

Alternatively, instead of each optical amplifier 11, line 1 can include a number of optical amplifiers placed in parallel in order to amplify the optical signals comprised in different bands of wavelengths (for example, the first, second and third band mentioned above).

For example, system 20 can be a submarine optical communication system, in which line 1 includes optical cables $1_1$, $1_2$, $1_3$, ... $1_n$ which connect respectively the transmitting station 22 to the first amplifier 11, such amplifier 11 to the following and the last amplifier 11 to the receiving station 24.

Each optical cable $1_1$, $1_2$, ... $1_n$ in comprises, for example, a transmission optical fibre length 10 and a compensating optical fibre length 12 according to the invention.

Alternatively, each optical cable $1_1$, $1_2$, ... $1_n$ comprises a transmission optical fibre length 10 and the compensating optical fibre length 12 is inserted between the last optical cable $1_n$ and the receiving station 24 and/or only in some optical cables $1_1$, $1_2$, ... $1_n$ depending on the applications.

Figure 8:
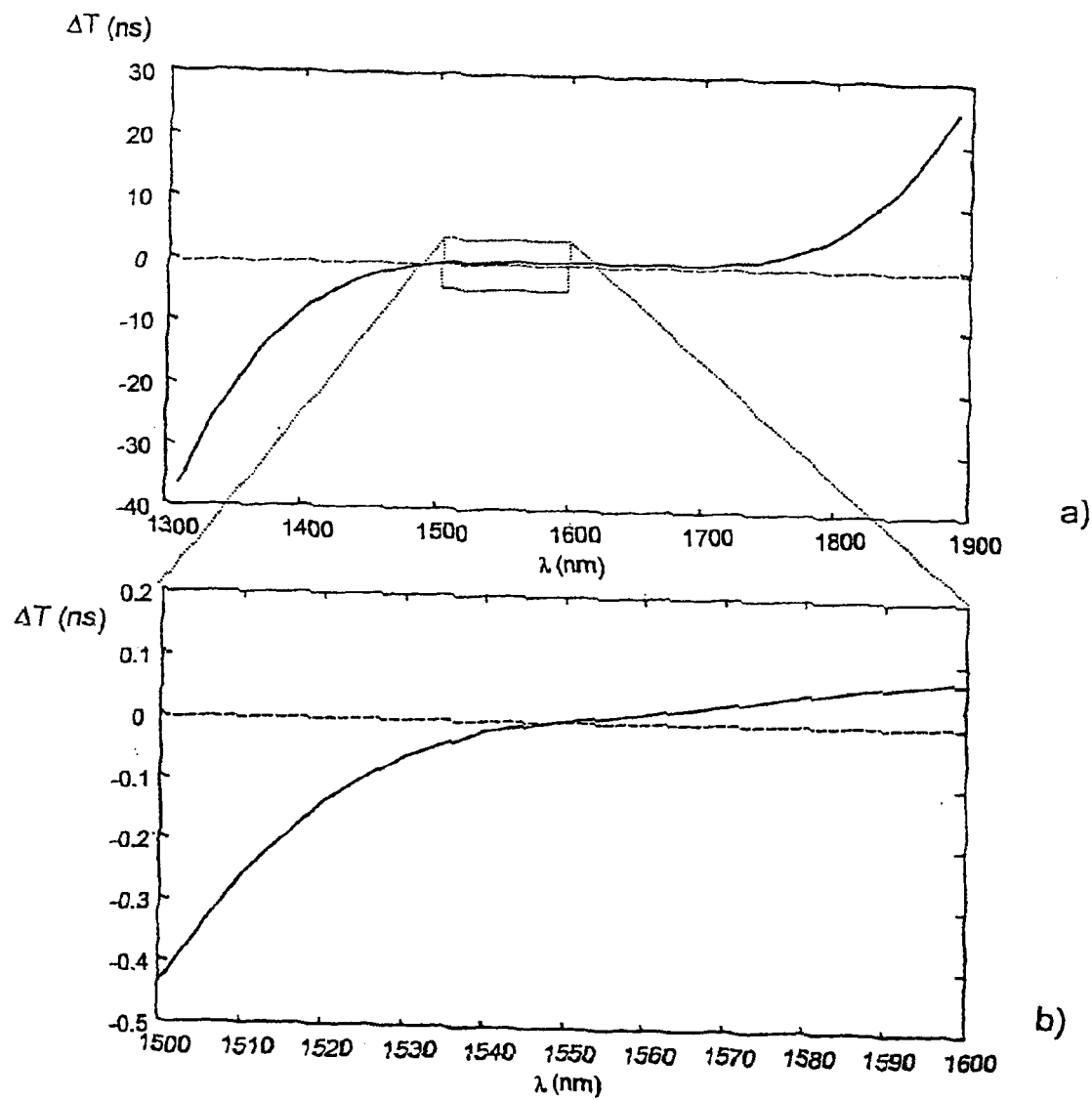
FIG. 8 illustrates the propagation delay (calculated with respect to the propagation time at 1550 nm) with respect to the wavelength $\lambda$ along an optical communication line comprising 100 Km of transmission optical fibre of the SMF type and 6.4 Km of compensating optical fibre according to the invention for $d/\Lambda=0.8$.

From the results illustrated in FIG. 8, the compensating optical fibre length 12 can efficiently compensate the chromatic dispersion as well as the chromatic dispersion slope of the lengths of transmission optical fibre 10 in a range of wavelengths between 1500 and 1600 nm which comprises the above-mentioned three transmission bands of the 128 WDM channels.

What is claimed is:

1. An optical communication line comprising:
   a transmission optical fibre length with, at a wavelength $\lambda$, a positive chromatic dispersion slope $s_t$;
   a compensating optical fibre length, associated to said transmission optical fibre length, having a negative chromatic dispersion slope $s_c$ suitable to compensate at least in part the positive chromatic dispersion slope $s_t$ of the transmission fibre, said compensating optical fibre having a core region surrounded by a cladding region, the cladding region defining a first ring of holes, which substantially defines, around the core region, an annulus with an inner radius r1 and an outer radius r2, and at least one second ring of holes that surrounds the first ring of holes, said holes running along the compensating optical fibre longitudinally and being spaced apart from each other substantially according to a predefined pitch $\Lambda$,
   wherein
   a) the values of said inner radius r1 and said outer radius r2 are selected in such a way as to substantially satisfy the following relationship (L)

$$r1 \leq \lambda/n \leq r2$$

where n is the refractive index of the material making up the core region of said compensating optical fibre length;
   b) the holes of said first and said at least one second ring are substantially of the same diameter d; and
   c) the ratio d/$\Lambda$ substantially satisfies the following relationship (A)

$$0.8 \leq d/\Lambda < 1.$$

2. An optical communication line according to claim 1, wherein the ratio d/$\Lambda$ substantially satisfies the following relation $$0.9 \leq d/\Lambda < 1.$$

3. An optical communication line according to claim 1, wherein the value of the diameter d is comprised between approximately 0.75 and 1.1 $\mu$m.

4. An optical communication line according to claim 1, wherein the value of $\Lambda$ substantially satisfies the following relationship (C)

$$\frac{\lambda}{n} * \frac{1}{1 + \frac{1}{2}\left(\frac{d}{\Lambda}\right)} \leq \Lambda \leq \frac{\lambda}{n} * \frac{1}{1 - \frac{1}{2}\left(\frac{d}{\Lambda}\right)}.$$

5. An optical communication line according to claim 4 wherein the value of $\Lambda$ substantially satisfies the following relationship (D)

$$\Lambda(\mu m) = 0.4 + \frac{0.44}{d/\Lambda} \pm 0.02 \ \mu m$$

so that said compensating optical fibre length has a negative chromatic dispersion slope $s_c$ suitable to efficiently compensate the positive chromatic dispersion slope $s_t$ of said transmission optical fibre length.

6. An optical communication line according to claim 1, wherein
   the transmission optical fibre length also has, at a wavelength $\lambda$, a positive chromatic dispersion coefficient $D_t$; and wherein
   the value of $\Lambda$ substantially satisfies the following relationship (F)

$$\Lambda(\mu m) = \alpha * \frac{D_t}{s_t} + \beta \pm 0.02 \ \mu m \text{ where}$$

$$\alpha = -10^{-4} * \left(2.685 * \frac{d}{\Lambda} + 5.987\right) \text{ and } \beta = 3.4 * \left(\frac{d}{\Lambda} - 1\right)^3 + 1.18$$

so that said compensating optical fibre length has such a chromatic dispersion coefficient $D_c$ and such a chromatic dispersion slope $s_c$ that the ratio $D_c/S_c$ is substantially equal to the ratio $D_t/s_t$ in order to compensate both the chromatic dispersion slope and the chromatic dispersion of the transmission optical fibre length.

7. An optical communication system comprising:
   a transmitting station suitable to provide an optical signal having a signal wavelength $\lambda$;
   a receiving station suitable to receive said optical signal;
   an optical communication line, optically connected to said transmitting station and said receiving station to transmit said optical signal, said line comprising at least one transmission optical fibre length having at a wavelength $\lambda$ a positive chromatic dispersion slope $s_t$, and a compensating optical fibre length, associated to said transmission optical fibre length, having a negative chromatic dispersion slope $s_c$ suitable to compensate at least in part the positive chromatic dispersion slope $s_t$ of the transmission fibre, said compensating optical fibre having a core region surrounded by a cladding region, the cladding region defining a first ring of holes, which substantially defines, around the core region, an annulus with an inner radius r1 and an outer radius r2, and at least one second ring of holes which surrounds the first ring of holes, said holes running along the compensating optical fibre longitudinally and being spaced apart from each other substantially according to a predefined pitch $\Lambda$ wherein
a) the values of said inner radius r1 and said outer radius r2 are selected in such a way as to satisfy the following relationship (L)

$$r1 \leq \lambda/n \leq r2$$

where n is the refractive index of the material making up the core region of said compensating optical fibre length;
b) the holes of said first and said at least one second ring are substantially of the same diameter d; and
c) the ratio d/Λ substantially satisfies the following relationship (A)

$$0.8 d/\Lambda \leq 1.$$

8. A device for compensating, at a wavelength λ, a positive chromatic dispersion of a transmission optical fiber comprising a compensating optical fibre length, comprising, in turn, a core region surrounded by a cladding region, the cladding region defining a first ring of holes, which substantially defines, around the core region, an annulus with an inner radius r1 and an outer radius r2, and at least one second ring of holes that surrounds the first ring of holes, said holes running along the compensating optical fibre longitudinally and being spaced apart from each other substantially according to a predefined pitch Λ,
wherein
a) the values of said inner radius r1 and said outer radius r2 are such as to satisfy the following relationship (L)

$$r1 \leq \lambda/n \leq r2$$

where n is the refractive index of the material making up the core region of said compensating optical fibre length;
b) the holes of said first and of said at least one second ring are substantially of the same diameter d; and
c) the ratio d/Λ substantially satisfies the following ratio (A)

$$0.8 \leq d/\Lambda \leq 1.$$

9. A device for compensating, at a wavelength λ, a positive chromatic dispersion of a transmission optical fiber comprising a compensating optical fibre comprising, in turn, a core region surrounded by a cladding region, the cladding region defining a first ring of holes that surrounds the core region and at least one second ring of holes that surrounds the first ring of holes, said holes running along the compensating optical fibre longitudinally and being spaced apart from each other substantially according to a predefined pitch Λ,
wherein
the holes of said first and said at least one second ring are substantially of the same diameter d;
the ratio d/Λ substantially satisfies the following relationship (A)

$$0.8 \leq d/\Lambda \leq 1; \text{ and}$$

the value of Λ is comprised between approximately 0.95 and 1.21 μm.

10. A method of designing a compensating optical fibre so that it has, at a predefined wavelength λ, a negative chromatic dispersion slope s, said compensating optical fibre having a core region surrounded by a cladding region, the cladding region defining a first ring of holes, which substantially defines, around the core region, an annulus with an inner radius r1 and an outer radius r2, said holes running along the compensating optical fibre longitudinally, having a diameter d and being spaced apart from each other substantially according to a predefined pitch Λ, said method comprising the steps of
a) selecting a value of the ratio d/Λ through the following relationship (B)

$$0.5 \leq d/\Lambda \leq 1; \text{ and}$$

b) selecting the values of said inner radius r1 and said outer radius r2 in such a way as to substantially satisfy the following relationship (L)

$$r1 \leq \lambda/n \leq r2$$

where n is the refractive index of the material making up the core region of said compensating optical fibre; and
wherein, when a compensating optical fibre is to be designed so that it has a negative chromatic dispersion coefficient $D_c$ and is capable of compensating a positive chromatic dispersion coefficient $D_t$ and a positive chromatic dispersion slope $s_t$, step b) is carried out by selecting the value of Λ in such a way as to satisfy the following relationship (E)

$$\Lambda(\mu m) = \alpha * \frac{D_t}{s_t} + \beta \pm 0.02 \ \mu m \text{ where}$$

$$\alpha = -10^{-4} * \left(2.685 * \frac{d}{\Lambda} + 5.987\right)$$

$$\beta = 3.14 * \left(\frac{d}{\Lambda}\right)^2 - 5.162 * \frac{d}{\Lambda} + 3.3476 \quad \text{for } 0.5 \leq d/\Lambda < 0.7$$

$$\beta = -3.4\left(\frac{d}{\Lambda} - 1\right)^3 + 1.18 \quad \text{for } 0.7 \leq d/\Lambda < 1$$

in such a way that the chromatic dispersion coefficient $D_c$ and the chromatic dispersion slope $s_c$ of said compensating optical fibre are such that the ratio $D_c/s_c$ is substantially equal to the ratio $D_t/s_t$.

11. A method of designing a compensating optical fibre according to claim 10, wherein step b) is carried out by selecting the value of Λ with the following relationship (C)

$$\frac{\lambda}{n} * \frac{1}{1 + \frac{1}{2}\left(\frac{d}{\Lambda}\right)} \leq \Lambda \leq \frac{\lambda}{n} * \frac{1}{1 - \frac{1}{2}\left(\frac{d}{\Lambda}\right)}$$

and in that, once the value of Λ has been selected, the value of d is determined through the value of the ratio d/Λ selected in step a).

12. A method of designing a compensating optical fibre according to claim 10, wherein step b) is carried out by selecting the value of Λ using the following relationship (D)

$$\Lambda(\mu m) = 0.4 + \frac{0.44}{d/\Lambda} \pm 0.02 \ \mu m$$

obtaining in this way an efficient compensating optical fibre.

13. A method of designing a compensating optical fibre so that it has, at a predefined wavelength λ, a negative chromatic dispersion slope $s_c$, said compensating optical fibre having a core region surrounded by a cladding region, the cladding region defining a first ring of holes, which substantially defines, around the core region, an annulus with an inner radius r1 and an outer radius r2, said holes running along the compensating optical fibre longitudinally, having a diameter d and being spaced apart from each other substantially according to a predefined pitch Λ, said method comprising the steps of a) selecting a value of the ratio d/Λ through the following relationship (B)

$0.5 \leq d/\lambda < 1$; and b) selecting the values of said inner radius r1 and said outer radius r2 in such a way as to substantially satisfy the following relationship (L)

$r1 \leq \lambda/n \leq r2$, where n is the refractive index of the material making up the core region of said compensating optical fibre,
and wherein step b) is carried out by selecting the value of Λ using the following relationship (D)

$$\Lambda(\mu m) = 0.4 + \frac{0.44}{d/\Lambda} \pm 0.02 \ \mu m,$$

obtaining in this way an efficient compensating optical fibre.

14. A method of designing a compensating optical fibre so that it has, at a predefined wavelength λ, a negative chromatic dispersion slope $s_c$, said compensating optical fibre having a core region surrounded by a cladding region, the cladding region defining a first ring of holes, which substantially defines, around the core region, an annulus with an inner radius r1 and an outer radius r2, said holes running along the compensating optical fibre longitudinally, having a diameter d and being spaced apart from each other substantially according to a predefined pitch Λ, the cladding region also defining at least one second ring of holes having substantially the same diameter as the first ring of holes, said method comprising the steps of a) selecting a value of the ratio d/Λ through the following relationship (B)

$0.5 \leq d/\lambda < 1$; and b) selecting the values of said inner radius r1 and said outer radius r2 in such a way as to substantially satisfy the following relationship (L)

$r1 \leq \lambda/n \leq r2$, where n is the refractive index of the material making up the core region of said compensating optical fibre.

15. A method of designing a compensating optical fibre according to claim 14, wherein the ratio d/Λ substantially satisfies the following relationship (A)

$0.8 \leq d/\Lambda < 1$.

16. A device for compensating, at a wavelength λ, a positive chromatic dispersion of a transmission optical fiber, the device comprising a compensating optical fibre length, comprising, in turn, a core region surrounded by a cladding region, the cladding region defining a first ring of holes, which substantially defines, around the core region, an annulus with an inner radius r1 and an outer radius r2, said holes running along the compensating optical fibre longitudinally, having a diameter d and being spaced apart from each other substantially according to a predefined pitch Λ, wherein a) the ratio d/Λ substantially satisfies the following relationship (B)

$0.5 d/\Lambda < 1$;

b) the values of said inner radius r1 and said outer radius r2 are such as to satisfy the following relationship (L)

$r1 \leq \lambda/n \leq r2$;

where n is the refractive index of the material making up the core region of said compensating optical fibre length; and c) the value of Λ is such as to substantially satisfy the following relationship (D)

$$\Lambda(\mu m) = 0.4 + \frac{0.44}{d/\Lambda} \pm 0.02 \ \mu m.$$

\* \* \* \* \*

UNITED STATES PATENT AND TRADEMARK OFFICE
CERTIFICATE OF CORRECTION

| | | |
|---|---|---|
| PATENT NO. | : 6,928,221 B2 | Page 1 of 1 |
| APPLICATION NO. | : 10/332950 | |
| DATED | : August 9, 2005 | |
| INVENTOR(S) | : Giacomo Gorni et al. | |

It is certified that error appears in the above-identified patent and that said Letters Patent is hereby corrected as shown below:

Title Page, Item 75, Inventors, line 1, "Marc" should read -- Marco --.

Claim 7, col. 23, line 16, "$0.8d/\Lambda \leq 1$" should read -- $0.8 \leq d/\Lambda < 1$ --.

Claim 8, col. 23, line 33, "$r1 \leq \Lambda/n \leq r2$" should read -- $r1 \leq \lambda/n \leq r2$ --.

Claim 8, col. 23, line 40, "following ratio" should read -- following relationship --.

Claim 8, col. 23, line 43, "$0.8 \leq d/\Lambda \leq 1$" should read -- $0.8 \leq d/\Lambda < 1$ --.

Claim 10, col. 23, line 67, "s," should read -- $S_c$, --.

Signed and Sealed this

Tenth Day of October, 2006

JON W. DUDAS
*Director of the United States Patent and Trademark Office*